US006800715B2

(12) United States Patent
Schrock et al.

(10) Patent No.: US 6,800,715 B2
(45) Date of Patent: Oct. 5, 2004

(54) LIGHTWEIGHT TIRE SUPPORT AND COMPOSITION AND METHOD FOR MAKING A TIRE SUPPORT

(75) Inventors: Alan K. Schrock, Midland, MI (US); Ralph D. Priester, Jr., Lake Jackson, TX (US); Wayne R. Willkom, Erie, CO (US); Robert E. O'Neill, Lake Jackson, TX (US); Martin C. Cornell, Lake Jackson, TX (US); Christopher P. Christenson, Beaverton, MI (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 10/359,785

(22) Filed: Feb. 7, 2003

(65) Prior Publication Data

US 2003/0158366 A1 Aug. 21, 2003

Related U.S. Application Data

(63) Continuation of application No. 09/738,027, filed on Dec. 13, 2000, now Pat. No. 6,548,616.
(60) Provisional application No. 60/170,343, filed on Dec. 13, 1999.

(51) Int. Cl.$^7$ .............................................. C08G 18/10
(52) U.S. Cl. ...................... 528/60; 528/77; 152/157; 152/331.1; 264/328.1; 521/159; 521/163; 524/783
(58) Field of Search .......................... 524/783; 528/60, 528/77; 521/159, 163; 152/157, 331.1; 264/328.1

(56) References Cited

U.S. PATENT DOCUMENTS

| | | | |
|---|---|---|---|
| 3,814,158 A | 6/1974 | Ryder | 152/158 |
| 4,048,105 A | 9/1977 | Salisbury | 260/2.5 AC |
| 4,125,660 A | 11/1978 | White et al. | 428/218 |
| 4,157,107 A | 6/1979 | Cataldo | 152/330 RF |
| 4,218,543 A | 8/1980 | Weber et al. | 521/51 |
| 4,248,286 A | 2/1981 | Curtiss, Jr. et al. | 152/158 |
| 4,293,016 A * | 10/1981 | Bible et al. | 152/158 |
| 4,297,444 A * | 10/1981 | Gilbert et al. | 521/160 |
| 4,318,435 A | 3/1982 | Heath-Coleman | 152/158 |
| 4,374,210 A | 2/1983 | Ewen et al. | 521/159 |
| 4,404,353 A | 9/1983 | Slagel | 528/67 |
| 4,416,844 A | 11/1983 | Wyman | 264/267 |
| 4,418,734 A | 12/1983 | Dobson | 152/158 |
| 4,420,570 A | 12/1983 | Dominguez | 521/112 |
| 4,461,333 A | 7/1984 | Filliol et al. | 152/158 |
| 4,530,941 A | 7/1985 | Turner et al. | 521/176 |
| 4,573,509 A | 3/1986 | Smith et al. | 152/158 |
| 4,592,403 A | 6/1986 | Stein et al. | 152/158 |
| 4,607,090 A | 8/1986 | Dominguez | 528/48 |
| 4,694,873 A | 9/1987 | Gerloff et al. | 152/380 |
| 4,732,200 A | 3/1988 | Price | 157/1.1 |
| 4,732,919 A | 3/1988 | Grigsby, Jr. et al. | 521/159 |
| 4,741,090 A | 5/1988 | Monnier | 29/464 |
| 4,742,090 A | 5/1988 | Hunter et al. | 521/124 |
| 4,751,951 A | 6/1988 | Dobson | 152/520 |
| 4,773,461 A | 9/1988 | Landers et al. | 152/520 |
| 4,798,862 A * | 1/1989 | Gillis, Jr. | 524/783 |
| 4,806,615 A | 2/1989 | Rice et al. | 528/68 |
| 4,882,411 A | 11/1989 | Grögler et al. | 528/54 |
| 4,934,425 A | 6/1990 | Gajewski et al. | 152/323 |
| 4,953,291 A | 9/1990 | Markow | 29/894.351 |
| 5,000,241 A | 3/1991 | Patecell | 152/382 |
| 5,022,450 A | 6/1991 | Weeks | 152/381.6 |
| 5,055,134 A | 10/1991 | Cassidy et al. | 106/38.22 |
| 5,064,875 A | 11/1991 | Grögler et al. | 521/159 |
| 5,115,852 A | 5/1992 | De Lorean | 152/518 |
| 5,141,967 A | 8/1992 | Mafoti et al. | 521/159 |
| 5,231,159 A | 7/1993 | Patterson et al. | 528/53 |
| 5,238,973 A | 8/1993 | Mayer et al. | 521/159 |
| 5,363,894 A | 11/1994 | Gouttebessis et al. | 152/158 |
| 5,418,260 A | 5/1995 | Smith | 521/159 |
| 5,422,414 A | 6/1995 | Smith | 528/60 |
| 5,450,887 A | 9/1995 | Habay et al. | 152/520 |
| 5,551,763 A | 9/1996 | Alsman | 301/64.7 |
| 5,668,739 A | 9/1997 | League et al. | 382/103 |
| 5,821,316 A | 10/1998 | Quay et al. | 528/64 |
| 5,891,279 A | 4/1999 | Lacour | 152/520 |
| 6,102,091 A | 8/2000 | Peterson et al. | 152/165 |
| 6,209,601 B1 | 4/2001 | Mārk | 152/158 |
| 6,548,616 B1 * | 4/2003 | Schrock et al. | 528/60 |

FOREIGN PATENT DOCUMENTS

| | | |
|---|---|---|
| CA | 1337448 | 8/1989 |
| CA | 2067588 | 10/1993 |
| DE | 40 38 996 A | 6/1992 |
| DE | 197 28 601 | 1/1999 |
| EP | 0 130 136 B1 | 6/1984 |
| EP | 0 133 150 B1 | 7/1984 |
| EP | 0 298 854 A1 | 7/1988 |
| EP | 0 408 201 A1 | 6/1990 |
| EP | 0 943 466 A2 | 3/1998 |
| EP | 0 894 648 A2 | 7/1998 |
| EP | 0 980 771 A2 | 7/1999 |
| GB | 1571916 | 1/1976 |
| JP | 3-197211 | 8/1991 |
| WO | WO 98/47728 | 10/1998 |
| WO | WO 99/64260 | 12/1999 |
| WO | WO 00/38937 | 7/2000 |
| ZA | 82/2605 | 4/1982 |

OTHER PUBLICATIONS

Wright et al.; Solid Polyurethane Elastomers; 1969; p. 123.*
Ulrich; Chemistry and Technology of Isocyanates; 1996; p. 368.*
Woods; ICI Polyurethanes; 1990; p. 189.*

* cited by examiner

Primary Examiner—Rachel Gorr

(57) ABSTRACT

A polyurethane-polymer composition suitable for preparing a lightweight tire support includes at least one isocyanate, at least one polyol, and at least one chain extender. A polyurethane-polymer composition can also include an additive such as a catalyst, a filler, a surfactant, a colorant, and a mold-release agent. A lightweight tire support can be prepared from a polyurethane-polymer composition by, for example, reaction injection molding. Such a tire support desirably has temperature stability and load-bearing capability.

22 Claims, 1 Drawing Sheet

LIGHTWEIGHT TIRE SUPPORT AND COMPOSITION AND METHOD FOR MAKING A TIRE SUPPORT

CROSS-REFERENCE TO RELATED APPLICATION

This application claims the benefit of U.S. Provisional Application Ser. No. 60/170,343, filed Dec. 13, 1999, which is hereby incorporated by reference, and is a continuation of Ser. No. 09/738,027, filed Dec. 13, 2000 and issued as U.S. Pat. No. 6,548,616.

FIELD OF THE INVENTION

This invention is directed to a lightweight tire support. This invention is particularly directed to a method and composition for preparing a lightweight tire support that is temperature stable and has load-bearing capability. More particularly, the invention is directed to a polyurethane-polymer composition that can be used to prepare a tire support and to a method of preparing a tire support from a polyurethane-polymer composition of the invention.

BACKGROUND OF THE INVENTION

A tire support for a vehicle tire is a support suitable for being mounted on a wheel rim inside of a tire. A tire support is a precautionary device against a tire losing air pressure, and it is intended to bear the weight of a vehicle if a tire loses partial or total air pressure to the extent that loss of vehicle control or irreparable damage to the tire might occur by continued use of the vehicle without a tire support.

A tire support is desirable because it can replace a spare tire to enable a vehicle to continue traveling to a service facility where inflation, repair, or replacement of an at least partially-deflated tire can be accomplished. This is advantageous for manufacturing small vehicles that lack the capacity for a spare tire and a jack, for reducing the overall weight of a vehicle to improve fuel economy, and for reducing the likelihood of additional vehicle damage when a vehicle continues after a tire loses air pressure.

Several devices intended for use as a tire support are known. Examples of tire supports are described in U.S. Pat. Nos. 4,248,286; 4,318,435; 4,418,734; 4,461,333; 4,592,403; 5,363,894; and 5,891,279.

A variety of materials, such as metals, rubbers, and plastic elastomers, have been used to prepare known tire supports. Tire supports made of metal are less than desirable because these types of devices do not withstand impacts well and can be fragile. Moreover, any failure in such a device can lead to a rapid and complete destruction of the tire within which the support is included.

Tire supports prepared from rubber are also less than desirable. Tire supports made from rubber generally weigh at least 7 kg and can weigh as much as 25 kg, which can adversely affect vehicle fuel economy. One type of tire support prepared from rubber includes a vulcanized mix of natural or synthetic rubber. This type of tire support can be incompatible with a tire and can prematurely degrade. For example, travel on a tire containing such a support can produce rapid and premature heating of the tire and of the support.

A variety of plastic elastomers have also been disclosed as useful for preparing a tire support. For example, elastomer compositions, such as a polyurethane, a latex, and a synthetic plastic, have been cited as useful for preparing a tire support. This type of support can have problems with, for example, temperature instability, with cracking, and with processing. Thus, the known plastic supports are less than desirable.

None of the known materials can provide a tire support with good load-bearing performance, temperature stability, and low-mass structural design. Also, methods known to be useful for preparing tire supports from known materials can be prohibitively expensive for commercial application and can require less than desirable processing times for making each support.

It would be desirable to prepare a support from a plastic elastomer, such as a polyurethane polymer, because materials needed to prepare a plastic elastomer are generally relatively inexpensive compared to other materials, such as rubber, and because a plastic elastomer can be lighter (that is, have less weight) than other materials such as rubber, which can be useful for improving fuel economy of a vehicle compared to the fuel economy of vehicles using known supports.

One challenge in making a tire support from a plastic elastomer is that an elastomer's properties are temperature dependent. That is, elastomers are generally ductile at room temperature (about 22° C.) but may not demonstrate similar characteristics as they are exposed to a range of temperatures, especially at high temperatures of greater than about 100° C. Because a tire support will be placed on vehicles that will be exposed to a variety of temperatures such as winter temperatures below 0° C. and summer temperatures of as high as 50° C. depending on geographic location and because a tire support can be exposed to an operating temperature of, for example, 120° C., a plastic elastomer should be relatively stable over a range of temperatures to provide desirable performance.

Another challenge in making a tire support from a plastic elastomer is that the elastomer's properties should be effective to provide a tire support with sufficient durability so that the tire support can provide desirable performance and be used for its intended purpose. That is, the support should be durable enough to be useful for supporting a vehicle's weight during run-flat conditions, which is known as being load bearing. This challenge becomes greater as the weight of a tire support is reduced to produce a lightweight tire support, for example, a tire support weighing no more than about 8 kg, because a polymer generally loses tensile modulus, which can lead to polymer deformations such as high frequency flexing, bending, and buckling of the polymer. These deformations can adversely affect durability. It is well known that a lightweight tire support is generally more prone to structural failure because a polymer becomes more prone to cracking and structural degradation when its mass is reduced.

It would be desirable to prepare a support with good load-bearing performance, good temperature stability and low-mass structural design. Specifically, there is a need to provide a tire support of a suitable polymeric composition that achieves these performance criteria. Additionally, there is a need for an efficient process for preparing a support from that composition. More specifically, there are needs for a polyurethane-polymer composition that can form a suitable tire support and for a process that can improve at least one of production time and manufacturing economics of a tire support.

SUMMARY OF THE INVENTION

According to the invention, a polyurethane-polymer composition suitable for preparing a lightweight tire support includes at least one isocyanate, at least one polyol, and at least one chain extender. At least one isocyanate is present in an amount effective to react with at least one chain extender to provide a hard-segment polymer and in an amount effective to react with at least one polyol to provide a soft-segment polymer. The hard-segment polymer and the soft-segment polymer are present in an amount effective for providing a tire support prepared from the composition with temperature stability and load-bearing capability.

Load-bearing capability can be determined by evaluating a tensile modulus for a test sample prepared from a polyurethane-polymer composition of the invention. In one embodiment, a polyurethane polymer's tensile modulus is at least 25 mPa at 80° C. but no greater than 60 mPa at 80° C. This measurement can be made according to ASTM D638.

Temperature stability can be determined by evaluating a change in tensile modulus over a temperature range for a test sample prepared from a polyurethane-polymer composition of the invention. In one embodiment, a polyurethane polymer's tensile modulus remains substantially unchanged over a temperature range of −50° C. to 150° C. This measurement can be made according to dynamic mechanical spectroscopy.

In one embodiment, a polyurethane-polymer composition of the invention includes at least two polyols including a polypropylene oxide and an ethylene oxide-capped polyol; at least one of an aliphatic amine chain extender, an aromatic amine chain extender, and a modified amine chain extender; and at least one isomer of diphenylmethanediisocyanate. The composition includes isocyanate in an amount effective to react with the chain extender to provide a hard-segment polymer in an amount of at least 25 weight percent and no greater than 45 weight percent based on the total weight of the composition. A tire support prepared from this composition has a weight of no greater than 8 kg, a tensile modulus of at least 30 mPa at 80° C. and no greater than 50 mPa at 80° C., and a change in tensile modulus of no more than 15 percent over a temperature range of −50° C. to 150° C.

Also according to the invention, a lightweight tire support can be prepared from a composition of the invention. A lightweight tire support generally includes a hard-segment polymer including a reaction product of an at least one first isocyanate and at least one chain extender and a soft-segment polymer including a reaction product of at least one second isocyanate and at least one polyol. The at least one first isocyanate and the at least one second isocyanate can be the same or different. The tire support includes the hard-segment polymer and the soft-segment polymer in an amount effective for providing the tire support with load-bearing capability and temperature stability.

A lightweight tire support of the invention can be prepared by injecting an isocyanate-side stream into a processing mold designed to mold a tire support; injecting a polyol-side stream into the processing mold; and reacting the isocyanate-side stream and the polyol-side stream in the processing mold. The isocyanate-side stream includes at least one isocyanate, and the polyol-side stream includes at least one polyol and at least one chain extender. A tire support prepared by this method includes a hard-segment polymer and a soft-segment polymer in an amount effective for providing the tire support with temperature stability and load-bearing capability.

DETAILED DESCRIPTION OF THE INVENTION

Figure 1:
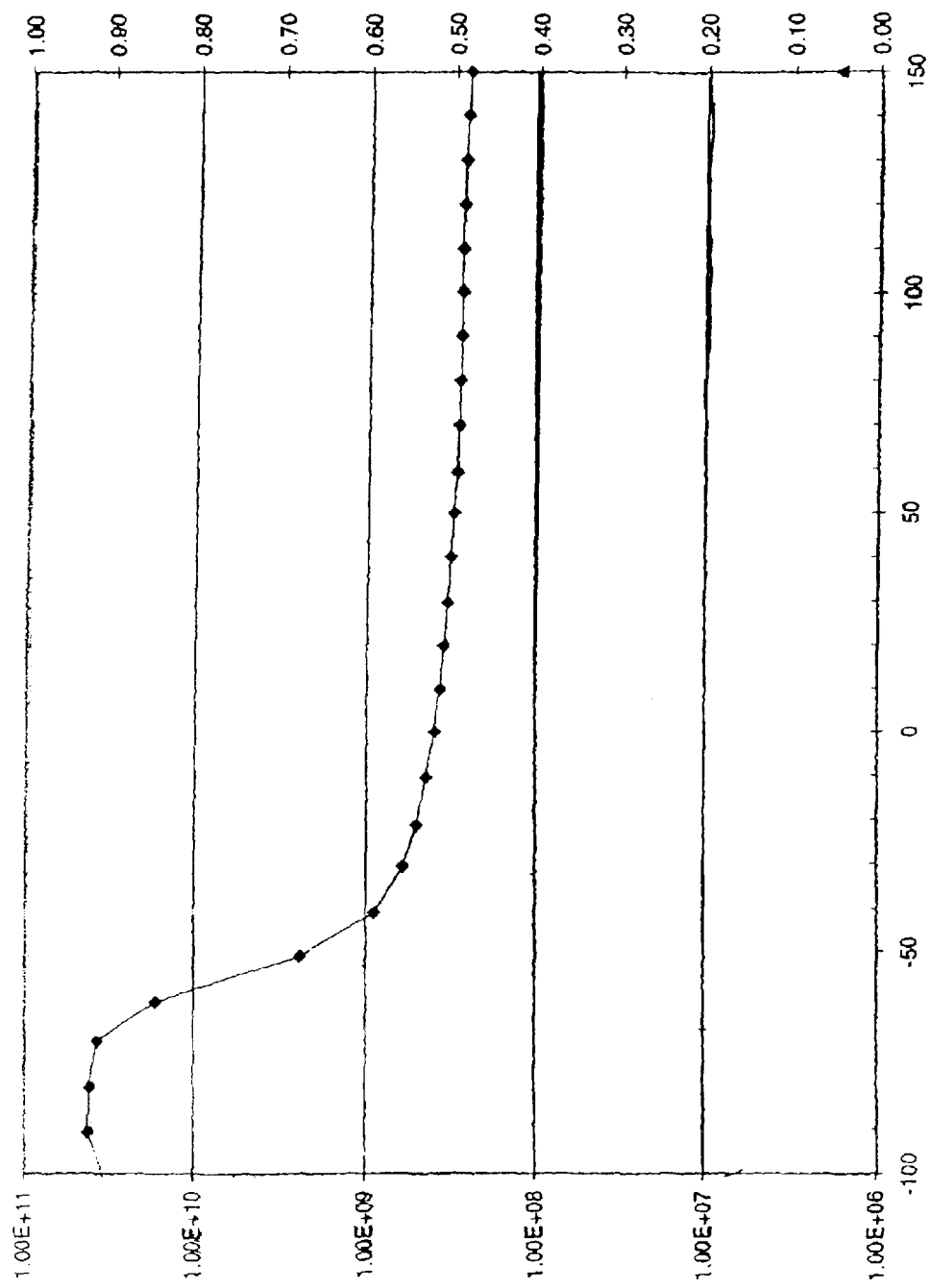
FIG. 1 shows the change in tensile modulus of one example of a polyurethane polymer of the invention over a temperature range of −100° C. to 150° C.

The invention is directed to a polyurethane-polymer composition that can be used to prepare a tire support and to a polyurethane polymer, particularly a polyurethane-polymer tire support, prepared from the composition. The invention is further directed to a method of preparing a polyurethane polymer, particularly a polyurethane-polymer tire support, from a polyurethane-polymer composition of the invention. A polyurethane polymer, particularly a polyurethane-polymer tire support, according to the invention is lightweight, load bearing, and temperature stable.

A tire support includes any device suitable for being placed in contact with a wheel rim to provide support to a vehicle, for example, a car, a truck, a bus, a trailer, a motorcycle, a recreation vehicle, or an aircraft, during run-flat conditions. Run-flat conditions include any condition in which tire air pressure is less than desirable for driving conditions, for example, when a tire loses partial or total air pressure and loss of vehicle control or irreparable tire damage may occur by continued use of the vehicle without the tire support.

A tire support of the invention is desirably load bearing. The term "load bearing" refers to a polyurethane polymer, particularly a polyurethane-polymer tire support, having mechanical properties effective to bear a vehicle's weight during run-flat conditions. Although other mechanical properties such as flexural modulus and compression modulus can be useful for evaluating load-bearing capability, for purposes of this specification, tensile modulus, which is also known as stiffness, can be the selected mechanical property suitable for evaluating a polyurethane polymer's load-bearing capability.

The term "tensile modulus" refers to the amount of force required to elongate or break a test sample of a polymer. One standard test that can be used to determine a polyurethane polymer's tensile modulus is American Standard Testing Method (ASTM) D638. A polymer's tensile modulus can indicate how brittle or soft a polymer is, which can further indicate how likely a polymer is to resist impact, cracking, and structural degradation.

A desirable tensile modulus generally depends on the type of vehicle that will be equipped with a tire support of the invention. For example, a tire support for a lighter vehicle such as a compact car or passenger car generally has a lower tensile modulus as compared to a tire support having the same structural design in a larger vehicle such as a van or sports utility vehicle.

A polyurethane polymer of the invention generally has a tensile modulus of at least about 25 mPa (mega Pascal) at 80° C., preferably at least about 30 mPa at 80° C., and more preferably at least about 35 mPa at 80° C. Generally the tensile modulus is no greater than about 60 mPa at 80° C., preferably no greater than about 50 mPa at 80° C., and more preferably no greater than about 40 mPa at 80° C.

Preferably a tire support's load-bearing performance is substantially unchanged over a temperature range that includes temperatures that a tire support can be exposed to while on a vehicle. Thus, a tire support of the invention is also desirably substantially temperature stable.

The terms "temperature stable" and "temperature stability" refer to a polyurethane polymer, particularly a polyurethane-polymer tire support, having at least one substantially unchanged mechanical property, which can be used to determine a polymer's load-bearing performance (for example, tensile modulus), over a temperature range. For such a test, a polymer can be exposed to a variety of temperatures, and the same mechanical property can be measured for that variety of temperatures. The change in the mechanical property over the temperature range can then be determined by determining the slope for the mechanical-property values plotted against temperature.

A polyurethane polymer's temperature stability can be determined by using methods known to one of skill in the art. One suitable method includes dynamic mechanical spectroscopy, which can be useful for determining a polymer's change in tensile modulus over a temperature range.

A polyurethane polymer of the invention is substantially temperature stable if the tensile modulus of the polymer remains substantially unchanged over a temperature range of −30° C. to 130° C., preferably over a temperature range of −40° C. to 140° C., and more preferably over a temperature range of −50° C. to 150° C. The term "substantially unchanged" means that the tensile modulus changes by no more than about 15 percent, preferably no more than about 10 percent, more preferably no more than about 8 percent, and still more preferably no more than about 5 percent over a temperature range of −30° C. to 130° C., preferably over a temperature range of −40° C. to 140° C., and more preferably over a temperature of −50° C. to 150° C.

Preferably a polyurethane polymer according to the invention has temperature stability substantially similar to vulcanized rubber. This is desirable because this suggests that a tire support prepared from a composition of the invention can have performance similar to a tire support prepared from rubber.

A tire support of the invention is desirably lightweight. The terms "lightweight" and "lightweight tire support" refer to a tire support having a weight effective for improving fuel economy of a vehicle on which a tire support of the invention is mounted as compared to the fuel economy of the same vehicle on which a conventional tire support is mounted. The actual weight of a tire support typically depends on its intended use. For example, a compact car or a passenger car can generally have a lighter support than, for example, a sports utility vehicle or a van.

A lightweight tire support of the invention generally has a weight of no greater than about 8 kg, preferably no greater than about 6 kg, and more preferably no greater than about 5 kg. Generally a lightweight tire support of the invention weighs at least 3 kg and preferably at least 4 kg.

Composition

A composition of the invention generally includes at least one isocyanate, at least one polyol, and at least one chain extender. These components are chosen such that upon reacting the components to form a polyurethane-polymer tire support, the tire support is lightweight, load bearing, and temperature stable. The terms "lightweight support," "load bearing," and "temperature stable" are as defined above.

A composition of the invention can also include additives that are known to be useful with polyurethane polymers such as catalysts, fillers, surfactants, and internal-mold-release agents.

In the invention, the term "polyurethane" can refer to polyurethane, polyurea, or a mixture of polyurea and polyurethane. A polyurethane material can be obtained by reaction of a polyol with an isocyanate. A polyurea material can be obtained by reaction of an amine with an isocyanate. A polyurethane material or polyurea material can contain both urea functionality and urethane functionality, depending on the components included in a composition. Preferably a composition of the invention is a mixture of polyurethane material and polyurea material, which is generally known as a polyureaurethane. For purposes of this specification, no further distinction will be made between polyurethane and polyurea.

Choosing the components for a composition of the invention can be directed by choosing components that will impart a polyurethane polymer, particularly a polyurethane-polymer tire support, with an amount of hard-segment polymer effective for providing the tire support with desirable load-bearing performance and with an amount of soft-segment polymer effective for providing the tire support with desirable temperature stability. The terms "load bearing" and "temperature stability" are as defined above.

A hard-segment polymer is generally derived from the reaction between an isocyanate and a chain extender. A composition of the invention can generally provide a hard-segment polymer in an amount effective for providing a tire support with desirable load-bearing performance, such as a desirable tensile modulus. This amount should not be so great that a composition of the invention becomes unprocessable, and the amount should not be so small that a tire support's load-bearing performance is substantially adversely affected. If a tire support's load-bearing performance is substantially adversely affected, a tire support is, for example, unable to withstand bearing the weight of a vehicle during run-flat conditions. Preferably a vehicle equipped with a tire support of the invention can travel at least about 100 km at a speed of 88 km/hr under run-flat conditions, more preferably at least about 150 km at a speed of 88 km/hr, and even more preferably at least about 175 km at a speed of 88 km/hr.

Generally the hard-segment polymer can be present in an amount of at least about 25 weight percent, preferably at least about 28 weight percent, and more preferably at least about 30 weight percent. But the hard-segment polymer generally is in an amount of no greater than about 45 weight percent, preferably no greater than about 42 weight percent, more preferably no greater than about 40 weight percent, and still more preferably no greater than about 35 weight percent. Weight percent of a hard-segment polymer is determined by adding the weights of chain extender and the stoichiometric amount of isocyanate and dividing this sum by the total weight of all components in the composition.

A soft-segment polymer is generally derived from the reaction between an isocyanate and a polyol. A composition of the invention can generally provide a soft-segment polymer in an amount effective for providing a tire support with desirable temperature stability. This amount should not be so small that a composition of the invention becomes unprocessable, and the amount should not be so great that a support's load-bearing performance is substantially adversely affected.

The soft-segment polymer is generally present in an amount of at least about 55 weight percent, preferably at least about 58 weight percent, and more preferably at least about 60 weight percent. But the amount of soft-segment polymer generally is no greater than about 75 weight percent, preferably no greater than about 72 weight percent, and more preferably no greater than about 70 weight percent. The soft-segment polymer is present in an amount of 100 less the weight percent of the hard-segment polymer.

Isocyanate

A polyurethane-polymer composition of the invention includes an isocyanate. Any isocyanate suitable for preparing a lightweight tire support can be used. One skilled in the art having read this specification would understand that isocyanates that promote ordering, for example, packing, of the hard-segment polymer would be desirable. One example of isocyanates that promote this ordering includes isocyanates having a high level of aromaticity.

The isocyanate can be advantageously selected from at least one of an organic polyisocyanate, a modified polyisocyanate, and an isocyanate-based prepolymer. These can include aliphatic, cycloaliphatic, and aromatic isocyanates. Examples of aromatic isocyanates are 2,4- and 2,6-toluenediisocyanate (TDI); 4,4'-, 2,4'-, and 2,2'-diphenylmethanediisocyanate (MDI); polyphenyl polymethylene polyisocyanates (PMDI); trimethyl xylylene diisocyanate (TMXDI); mixtures of PMDI and MDI; and mixtures of PMDI and TDI. Preferably the isocyanate is at least one of 4,4'-, 2,4'-, and 2,2'-diphenylmethanediisocyanate (MDI). Although TDI is a suitable isocyanate, a composition of the invention can be substantially free of TDI.

Examples of aliphatic and cycloaliphatic isocyanates include such compounds as trans, trans-1, 4-cyclohexyl diisocyanate; 2,4- and 2,6-hexanhydrotoluenediisocyanate; 4,4'-, 2,2'-, and 2,4'-dicyclohexylmethanediisocyanate; and isophorone diisocyanate.

Other useful isocyanates include the so-called modified multifunctional isocyanates, that is, products that are obtained through chemical reactions of the above isocyanates. Exemplary are isocyanates containing esters, ureas, biurets, allophanates, carbodiimides, uretonimines, and urethane groups containing diisocyanates or polyisocyanates. Isocyanates containing carbodiimide groups and/or uretonimine groups having an isocyanate-group (NCO) content of from about 10 to about 40 weight percent more preferably from about 20 to about 35 weight percent, can also be used. These include, for example, isocyanates based on 4,4'-, 2,4'-, or 2,2'-MDI and a mixture of MDI isomers; 2,4- or 2,6-TDI and mixtures of TDI isomers; mixtures of MDI and PMDI, mixtures of TDI and PMDI, diphenylmethane diisocyanates, and mixtures thereof.

In a preferred embodiment, the isocyanate includes at least about 6 weight-percent NCO and preferably at least about 7 weight-percent NCO. But the isocyanate generally includes no more than about 15 weight-percent NCO and preferably no more than about 12 weight-percent NCO.

A composition of the invention generally includes isocyanate in an amount effective for providing a desirable amount of hard-segment polymer. This amount should not be so high that a composition of the invention becomes unprocessable or so low that temperature stability of a polymer, load-bearing performance of a polymer, or both is substantially adversely affected.

Polyol

A polyurethane-polymer composition of the invention also includes a polyol. Any isocyanate-reactive material suitable for preparing a lightweight tire support can be used. A polyol suitable for preparing a lightweight tire support is generally chosen based on monol content, equivalent weight, functionality, and oxide composition.

A polyol's monol content refers to the amount of unsaturation in a polyol. Unsaturation is defined as the number of polyol molecules (monofunctional species) having a single reactive site. A polyol suitable for use with the invention generally has a polyol content effective to produce a polyurethane polymer with a high molecular weight, which can facilitate achieving desirable durability according to the invention. Generally a polymer prepared from a composition of the invention has a molecular weight of at least 100,000.

According to the invention, a polyol's monol content can be up to about 0.04 milliequivalents per gram of the total composition and is generally no greater than about 0.035 milliequivalents per gram of the total composition, preferably no greater than about 0.03, and more preferably no greater than about 0.02.

In one embodiment, a composition of the invention is prepared by reacting an isocyanate-side stream and a polyol-side stream by reaction injection molding. According to this embodiment, the polyol-side stream includes a polyol monol content of about 0.035 milliequivalents per gram of the total composition, while the isocyanate-side stream includes a polyol monol content of about 0.02 milliequivalents per gram of the total composition.

According to the invention, a polyol's equivalent weight is effective to facilitate cure of a polymer and to facilitate a polymer's desirable temperature stability. The equivalent weight should not be so high that a composition of the invention becomes substantially difficult to process.

Generally a polyol suitable for use in the invention has an equivalent weight of at least about 1,250; preferably at least about 1,500; and more preferably at least about 1,600. Typically the polyol's equivalent weight is no greater than about 4,000; preferably no greater than about 3,000; and more preferably no greater than about 2,500. These equivalent weights can correspond to molecular weights between about 4,500 and about 10,000.

A polyol's functionality is effective to facilitate temperature stability of a polyurethane polymer and to facilitate processability of a composition of the invention. The functionality should not be so low that a composition of the invention can take an undesirable amount of time to set up in a mold. But the functionality should not be so high that it substantially adversely affects temperature stability of the polymer. According to the invention, a polyol can have a functionality of at least about 1.9, preferably at least about 2.5, more preferably at least about 2.7, and even more preferably at least about 2.8. Generally the functionality is no greater than about 4.0, preferably no greater than about 3.7, and more preferably no greater than about 3.3.

In one embodiment, the functionality is at least 1.94. In another embodiment, the functionality is between about 2.8 and about 3.3.

A polyol can have a narrow molecular-weight distribution, which renders a low polydispersity, being effective to facilitate a polyurethane polymer's temperature stability. A polyol's polydispersity is generally no greater than about 1.25, preferably no greater than about 1.2, and still preferably no greater than about 1.15. Typically the polydispersity is at least about 1.05, preferably at least about 1.02, and more preferably at least about 1.0.

Polyols useful in the invention include polyether polyols, polyester polyols, and hydrocarbon-based polyols.

Preferably a polyol suitable for use in the invention includes a polyether diol, a polyether triol, a polyether tetrol, or a combination of these polyols. These can be used alone or in combination, which is generally known as a blend. A hydroxyl-terminated poly(oxypropylene) diol, triol, or combination of this diol and this triol is preferred. Examples of a polyether polyol include alkylene oxides, such as polypropylene oxide, polybutylene oxide, ethylene oxide, and polytetramethylene oxide (PTMO). Preferably a polyol suitable for use in the invention includes a polypropylene oxide. According to the invention, a polyol's oxide content can be effective to facilitate phase separation. That is, facilitate separation of soft-segment polymers and hard-segment polymers.

Examples of specific ethylene oxide-containing polyethers include VORANOL™ 4702, VORANOL™ 4701, VORANOL™ 4815, VORANOL™ 5148, VORANOL™ 5287, and VORANOL™ 3137, all produced by The Dow Chemical Company.

A polyether polyol can be prepared by known methods such as by alkoxylation of suitable starter molecules. Such a method generally involves reacting an initiator such as, water, ethylene glycol, or propylene glycol, with an oxide in the presence of a catalyst. A polyether polyol can include a dispersed filler, for example, vinyl polymers, polyureas, or polyhydrazides.

Ethylene oxide, propylene oxide, butylene oxide, or a combination of these oxides can be particularly useful for the alkoxylation reaction. A polyol is preferably prepared using a catalyst system based on an alkali-metal hydroxide such as cesium hydroxide or potassium hydroxide, double metal cyanide (DMC), and strong phosphorus bases such as phosphazenium. The preparation of a polyol using these catalyst systems is known to a person of ordinary skill in the art.

It is to be understood that other than a polyoxyethylene polyol, a polyether polyol can contain alkyl substituents. But one skilled in the art having read this specification would appreciate that nonalkyl-substituted polyether polyols such as polyoxytetramethylene polyol can be utilized in a blend. In one embodiment, a nonalkylsubstituted polyether intermediate is present in an amount less than about 50 weight percent based on the total weight of the blend.

A polyether polyol suitable for use with the invention can be a heterofeed, a blockfeed, or capped with, for example, ethylene oxide or propylene oxide. These types of polyols are all known and used in polyurethane chemistry.

In one embodiment, a composition of the invention is prepared by mixing a polyol-side stream that contains polyol and an isocyanate-side stream that contains an isocyanate prepolymer, preferably the isocyanate-side stream includes a polyol that is ethylene-oxide capped.

An ethylene oxide-capped polyol can be useful to facilitate processablity of a composition of the invention or to facilitate compatibility of components in a composition of the invention. Because ethylene oxide can be an expensive reagent, desirably a polyol useful with the invention is not ethylene-oxide capped. In one embodiment in which a composition of the invention is prepared by mixing a polyol-side stream and an isocyanate-side stream, which contains an isocyanate prepolymer, using RIM, the isocyanate-side stream preferably includes a polyol and is substantially free of an ethylene oxide-capped polyol.

In one embodiment using RIM, an isocyanate can be utilized as a prepolymer with a portion of the polyol. This would preferably be done using polyether polyol that does not contain any ethylene-oxide end blocks, which can be made in a conventional manner as known in the art. The number average molecular weight of such a polyether polyol can be from about 200 to about 9,000, preferably from about 500 to about 8,000, and more preferably from about 1,000 to about 8,000. The number average molecular weight is generally greater than about 2,000. A prepolymer having about 15 weight percent NCO or less is particularly useful for this embodiment. A preferred prepolymer is the reaction product of the isocyanate and the polyol such that there is at least a slight excess of the isocyanate without extensive coupling of the polyol.

Chain Extender

A polyurethane-polymer composition of the invention includes a chain extender. A chain extender for the invention is selected to provide a desirable reaction time for a composition of the invention and to provide a hard-segment polymer effective for providing a polyurethane polymer with desirable load-bearing performance. A suitable chain extender is typically a low equivalent-weight active hydrogen-containing compound that has about 2 or more active hydrogen groups per molecule. The active hydrogen groups can be hydroxyl, mercaptyl, or amino groups. A chain extender can be aliphatic or aromatic. Preferably a composition of the invention includes an aromatic chain extender.

A chain extender having at least two active hydroxyl groups can be compounds of low molecular-weight oligomers such as propylene oxide, ethylene oxide, butanediol, ethylene glycol, and neopentyl glycol.

Preferably a chain extender has at least two active amino groups.

Examples of an aliphatic amine chain extender suitable for the invention include ethylene diamine; 1,3-diaminopropane; 1,4-diaminobutane; hexamethylenediamine; aminoethanolamine; 1,4-diaminocyclohexane; and triethylenetetramine.

More preferably a chain extender is aromatic and has at least two active amino groups. Any salts, such as potassium chloride or sodium chloride salts, of these compounds are also useful. Examples of aromatic amine chain extenders include 3,5-diethyl-2,4-toluene diamine; 3,5-diethyl-2,6'-toluene diamine; 2,4-diaminotoluene; 2,6-diaminotoluene; 1,5-napthalenediamine; 1,4-phenylenediamine; 1,4-diaminobenzene; 4,4'-methylene bis(orthochloroaniline) ("MOCA"); 1,4-butylene glycol; 4,4'-methylenebisdianiline (MDA); and 3,3',5,5'-tetraisopropyl-4,4'-methylenebisaniline.

Water can also act as suitable chain extender.

An amine chain extender can be blocked or encapsulated, or can have delayed action or on-demand cure, or can be otherwise rendered less reactive to control reactivity of the chain extender with an isocyanate. This can be desirable when an amine chain extender without such a modification would substantially adversely affect filling of a processing mold.

Delayed-action amine chain extenders include salts of methylenedianiline (MDA), such as a sodium chloride complex of MDA; 4,4'-methylene bis(orthochloroaniline) ("MOCA"); and some sterically-hindered secondary amines. Sterically-hindered secondary amines are commercially available from UOP, Inc. under the trademarks UNILINK 2100™ and UNILINK 3100™. Delayed-action derivatives of DETDA are also useful but less preferred than DETDA.

A chain extender is present in an amount effective to facilitate formation of a hard-segment polymer. A chain extender should not be included in so large of an amount that it substantially adversely affects filling of a processing mold or in so small of an amount that it substantially adversely affects thermal stability of a polymer, load-bearing capability of a polymer, or both. The amount of chain extender suitable for use with the invention will typically depend on the type of chain extender selected and the desirable amount of hard segment. One skilled in the art having read this specification would understand how to determine the amount of chain extender suitable for the invention.

When a composition of the invention is prepared by reaction injection molding in which a reaction mixture of a polyurethane prepolymer is admixed with a reaction mixture of a polyol, a chain extender can also be used to build the molecular weight of a polyurethane prepolymer by reacting the chain extender with an isocyanate in the polyurethane prepolymer. Although less preferred, the chain extender can completely replace the amount of polyol added on the polyol-side of the reaction.

Additives

A composition of the invention can also include known additives and other known components to prepare a tire support with desired properties. Generally any additive known to one of skill in the art to be useful in preparing a polyurethane-polymer composition can be included in a composition of the invention so long as the additive is not substantially incompatible with other components in the composition. Examples of additives include catalysts, fillers, fire retardants, colorants such as pigments or dyes, antistatic agents, reinforcing fibers, antioxidants, acid scavengers, and other additives useful in polyurethane-polymer compositions.

A polyurethane-polymer composition of the invention can include a catalyst. A catalyst can be used to promote the reaction between a chain extender and an isocyanate or between a polyol and an isocyanate, to increase the rate of cure of a tire support prepared from a composition, or both.

Examples of suitable catalysts include organic and inorganic salts of, and organometallic derivatives of, bismuth, lead, tin, antimony, uranium, cadmium, cobalt, thorium, aluminum, mercury, zinc, nickel, cerium, molybdenum, vanadium, copper, manganese, and zirconium as well as phosphines and tertiary organic amines. For example, suitable catalysts include di-n-butyl tin bis(mercaptoacetic acid isooctyl ester), dimethyl tin dilaurate, dibutyl tin dilaurate, dibutyl tin sulfide, stannous octoate, lead octoate, ferric acetylacetonate, bismuth carboxylates, triethylene diamine, and N-methyl morpholine.

A catalyst can be added in an amount effective to facilitate cure of a tire support such that it is substantially tack free. A catalyst should not be added in so large of an amount that a polyurethane polymer composition reacts too quickly, leaving voids in a tire support molded from a composition, which can substantially adversely affect its load-bearing properties.

If an organometallic catalyst is added to a composition of the invention, it can be added in an amount of at least about 0.01, preferably at least about 0.02, and more preferably at least about 0.03 parts per 100 parts of the polyurethane-polymer composition by weight. Generally a composition of the invention includes an organometallic catalyst in an amount of no greater than about 0.07, preferably no greater than about 0.06, and more preferably no greater than about 0.05 parts per 100 parts of polyurethane-polymer composition by weight.

If a tertiary amine catalyst is added to a composition of the invention, the catalyst can be added in an amount of about 0.01 to about 3 parts of tertiary amine catalyst per 100 parts of the polyurethane-polymer composition by weight.

A tertiary amine catalyst and an organometallic catalyst can be used in combination. In one embodiment, a composition of the invention includes a catalyst and the catalyst includes at least one of triethylene diamine and dibutyl tin dilaurate. In a preferred embodiment, a catalyst includes a 50:50 mixture of triethylene diamine and dibutyl tin dilaurate.

A composition of the invention can also include conventional fillers such as mica, carbon black, glass fibers, flakes, nanoclays, or other known fillers. Mica, glass fibers, and flakes may be used to increase the polymer modulus. This can permit reductions in polymer cross-sectional thickness and can further provide associated weight reductions.

A composition of the invention can include an antioxidant. An antioxidant can be advantageous to reduce or retard photolytic or free-radical degradation of a polyurethane polymer prepared from the composition. Suitable antioxidants include 2,6-di-t-butylphenol and polyalkylene glycol esters of hindered phenols of substituted alkanoic acids. Examples include 3,5-di-t-butyl-4-hydroxybenzoic acid ester of ethylene glycol, bis{3-(3-methyl-5-t-butyl-4-hydroxyphenyl) propionate} of trimethylene glycol. The last example is a preferred product commercially available from Ciba-Geigy under the trade name IRGANOX 245.

A composition of the invention can also include a surfactant. A surfactant can be advantageous for facilitating flow of a composition into a mold and for facilitating release of a polyurethane polymer from a mold. Suitable surfactants include silicone-based alkylation products and silicone hydride or hydroxide, which has been reacted with at least one of ethylene oxide, propylene oxide, or butylene oxide.

A composition of the invention can also include a mold-release agent. A mold-release agent can be advantageous for facilitating release of a polyurethane polymer from a mold. Suitable mold-release agents include zinc stearate, waxes, or silicone oil.

Method

To prepare a polyurethane polymer, particularly a polyurethane-polymer tire support, from a composition of the invention, any known molding process can be used. For example, casting, injection molding, and reaction injection molding (RIM) can be used. Preferably a polyurethane polymer, particularly a tire support, is prepared from a composition of the invention by RIM.

RIM is a technique for the rapid mixing and molding of fast-curing polyurethane polymers in a processing mold. RIM can be carried out according to known methods. See for example, U. S. Pat. Nos. 4,297,444; 4,806,615; 4,742,090; 4,404,353; 4,732,919; 4,530,941; and 4,607,090.

RIM parts are generally prepared by mixing an active hydrogen-containing material such as a polyol with an isocyanate while injecting the mixture into a processing mold. The reaction between the hydrogen-containing material and the isocyanate is completed within the mold. Generally this reaction occurs between about 0.5 minute and about 5.0 minutes, preferably between about 0.5 minute and about 1 minute, and the resulting polymer is substantially tack free. "Substantially tack free" means that the molded polymer has enough structural integrity such that it is not substantially distorted when removed from a processing mold.

After molding and demolding (that is, removing from a processing mold) a polyurethane polymer, the polymer can be subjected to an additional conventional curing step effective to substantially finish reacting active groups. For curing, the polymer can be placed at a temperature of about 200° F. (93° C.) up to a temperature of about 450° F. (204° C.) for between about 1 and about 24 hours. The molding and curing times of a polymer of the invention are not critical but can certainly facilitate manufacturing economics.

Generally RIM includes a method of using polymerization of an isocyanate and a polyol blend including at least one polyol, at least one chain extender, and any additives in a processing mold to prepare plastic parts. The isocyanate and polyol are typically metered into an impingement mixhead in two fluid input streams known as an isocyanate-side stream and a polyol-side stream and then delivered to a processing mold where the isocyanate-side stream and the polyol-side stream react. A composition of the invention generally has an isocyanate index of between about 95 and about 110. Typically a composition of the invention includes at least a slight excess of isocyanate, for example, at an isocyanate index of about 105. The term "isocyanate index" is a factor that is determined by dividing the number of isocyanate groups by the number of isocyanate-reactive groups and then multiplying the result by 100.

The isocyanate-side stream generally includes an isocyanate while the polyol-side generally includes a chain extender, a polyol, and any additives such as a catalyst, a colorant, a filler, and a surfactant.

The isocyanate-side stream can include an isocyanate alone or it can include an isocyanate prepolymer. An isocyanate prepolymer generally includes a mixture of a prereacted isocyanate and at least a portion of a polyol up to, and including, 100 percent of the polyol included in a polyurethane-polymer composition of the invention. Although not a requirement, an isocyanate prepolymer can include an excess of—NCO.

The metering can be done by any metering device known in the art such as, for example, a Krauss Maffei KK 120 Metering Machine. The mixhead is designed to mix the polyol-side and isocyanate-side streams together and subsequently inject them into a processing mold.

The head pressure used to fill the processing mold is typically great enough to facilitate mixing of the streams but not so great as to result in equipment failure. The head pressure used to fill the processing mold is typically no greater than about 3,500 psi, preferably no greater than about 2,500 psi, and is typically at least about 500 psi, preferably at least about 1,000 psi. Reactants are injected typically at about 100 to about 1500 grams per second into the mold.

The temperature of the isocyanate-side and polyol-side streams is typically controlled to facilitate mixing of all components, but the temperature should not be so high that the polymeric reaction happens so quickly that the processing mold does not fill properly. Suitable processing temperatures can generally range from about 40° C. to about 120° C. and preferably about 65° C. to about 75° C.

During RIM, gases such as nitrogen, helium, and carbon dioxide, can be finely dispersed in at least one of an isocyanate-side stream and a polyol-side stream. This process can yield a microcelluar polymer that has a density of less than 1 g/cc but still substantially maintains its noncellular polymer performance as if its density were about 1 g/cc. This process can be advantageous for further reducing a polymer's weight beyond that which would be produced without dispersed gases. This process can also be advantageous-to facilitate flow of a composition of the invention into a processing mold. A polyurethane polymer of the invention, particularly a polyurethane-polymer tire's support, can advantageously be prepared by RIM. One advantage of molding a composition of the invention by RIM can include desirable processing times for making each support. For example, one conventional method—centrifugal molding—can require molding times of as much as 24 hours, but a composition of the invention can be molded in an amount of time of between about 0.5 minutes and about 5.0 minutes, preferably no greater than about 1.0 minute.

Another advantage of molding a composition of the invention by RIM can include desirable filling of a processing mold. Because a composition of the invention is delivered into a processing mold as a fluid, the composition can substantially fill a processing mold. By substantially filling a processing mold, a composition of the invention is less likely to leave voids and air pockets in a polyurethane polymer prepared by the composition. This can be particularly advantageous when a processing mold has a complicated design such as a design that has at least one curve, at least one corner, or at least some corrugation. One example of a complicated design is shown in U.S. Pat. No. 5,363,894. This can also be advantageous for production of a light-weight polyurethane polymer because the less material that is introduced into a processing mold, the more difficult it becomes to substantially fill the processing mold.

This invention will be further described by the following Example. This Example is not meant to limit the scope of this invention but to further illustrate one embodiment of the invention.

EXAMPLES

Example 1

Determination of Temperature Stability of a Polyurethane Polymer Prepared from a Composition of the Invention To determine the temperature stability of a polyurethane polymer prepared from a composition of the invention, a polyurethane polymer was molded from a composition of the invention by reaction injection molding. The temperature dependence of the polyurethane polymer's tensile modulus was then determined by measuring the tensile modulus over a range of temperatures and subsequently measuring the change in tensile modulus.

A polyurethane-polymer composition according to the invention was prepared by admixing a polyol-side stream and an isocyanate-side stream using reaction injection molding to mold a polyurethane-polymer plaque (6 in.×6 in.×⅛ in. thick) (15.24 cm×15.24 cm×0.32 cm).

The polyol-side stream included a polyol formulation. The polyol formulation included a polyol in an amount of 54.81 weight percent, a chain extender in an amount of 44.84 weight percent, a surfactant in an amount of 0.25 weight percent, and a catalyst in an amount of 0.1 weight percent.

For the polyol formulation, the polyol was an ethylene-oxide capped 5,000 molecular-weight triol having a maximum unsaturation of 0.035 milliequivalents per gram of the total composition (available from The Dow Chemical Co., Freeport, Tex.). The chain extender was diethyl toluene diamine (a mixture of 3,5-diethyl-2,4- and 2,6'-toluene diamines) (available from The Dow Chemical Co., Freeport, Tex.). The surfactant was a silicone surfactant (L-1000; available from OSI Specialties/Witco Corp., Chicago, Ill.). The catalyst included a 50:50 combination of triethylene diamine (Dabco 3LV) (available from Air Products and Chemicals, Inc., Allentown, Pa.) and dibutyl tin dilaurate (Fomrez UL28) (available from Witco Chemical Co., Chicago, Ill.).

The isocyanate-side stream included a prepolymer formulation. The prepolymer formulation included a first isocyanate in an amount of 31.83 weight percent, a polyol in an amount of 63.17 weight percent, and a second isocyanate in an amount of 5.0 weight percent.

For the prepolymer formulation, the first isocyanate was 98 percent pure p,p'-MDI (Isonate 125M) (available from The Dow Chemical Company, Freeport, Tex.). The polyol was an ethylene-oxide capped (15 percent) 6,000 molecular weight triol with a maximum unsaturation of 0.02 milliequivalent per gram of total composition (available from Asahi). And the second isocyanate was 50 percent p,p'-MDI and 50 percent o,p-MDI (Isonate 50 OP) (available from The Dow Chemical Company, Freeport, Tex.).

The isocyanate-side stream and the polyol-side stream were combined in a weight-ratio blend of about 2.15:1 (isocyanate to polyol) using standard RIM processing conditions.

The polyurethane-polymer plaques prepared from these components included a hard-segment polymer in an amount of about 34 weight percent. The tensile modulus was measured to be about 50 mPa at 80° C.

The temperature stability of the polyurethane polymer was determined by a known method-dynamic mechanical spectroscopy. This method generally measures the change in tensile modulus of the polymer over a temperature range, which was −100° C. to 150° C. in this case.

FIG. 1 shows the tensile modulus of the polyurethane polymer at temperatures ranging between −100° C. and −150° C. The change in tensile modulus over this temperature was about 1 percent. Because the change in tensile modulus over a temperature range of 50° C. to 150° C. did not exceed 15 percent, the polyurethane polymer is temperature stable.

It will be apparent to one of ordinary skilled in the art that many changes and modifications can be made in the invention without departing from the spirit or scope of the claims. Thus, the scope of the invention should be determined by the appended claims and their legal equivalents, rather than by the embodiments given here.

What is claimed is:

1. A lightweight tire support for use in a run flat tire, the light weight tire support being comprised of a polyurethane that is the reaction product of:
   (a) a polyol, wherein the polyol comprises a first polyol and a second polyol, the first polyol being a polypropylene oxide polyol and the second polyol being an ethylene oxide-capped polyol;
   (b) a chain extender;
   (c) an isocyanate, the isocyanate being present in an amount effective to react with the chain extender to provide a hard-segment polymer and in an amount effective to react with the polyol to provide a soft-segment polymer such that the polyurethane has a tensile modulus that changes by no more than 15 percent over a temperature range of −50° C. and 150° C. based on dynamic mechanical spectroscopy and the tensile modulus is at least 20 MPa at 80° C. and no greater than 60 MPa at 80° C. as determined by ASTM D638; and
   (d) a compound selected from group consisting of zinc stearate, a wax, a silicone oil and combination thereof.

2. The lightweight tire support of claim 1, wherein the isocyanate is comprised of a first isocyanate and a second isocyanate.

3. The light weight tire support of claim 2, wherein the first isocyanate is 4,4'-diphenylmethanediisocyanate, 2,4'-diphenylmethanediisocyanate, 2,2'-diphenylmethanediisocyanate or combination thereof and the second isocyanate is an isocyanate prepolymer of a polyol having a molecular weight of at least about 4500.

4. The light weight tire support of claim 1, wherein the isocyanate has an NCO content of from 6 weight percent to 15 weight percent.

5. The light weight tire support of claim 1, wherein the isocyanate is present in an amount effective to react with the chain extender such that the hard-segment polymer is present in an amount of at least 25 weight to 45 weight percent based on the total weight of polyurethane.

6. The lightweight tire support of claim 1, wherein the chain extender is an aliphatic amine chain extender, an aromatic amine chain extender, or a modified amine chain extender.

7. The lightweight tire support of claim 6, wherein said chain extender is 3,5-diethyl-2,4- or 2,6'-toluene diamine or combination thereof.

8. The lightweight tire support of claim 1 further comprising at least one of a catalyst, a filler, a fire retardant, a colorant, an antistatic agent, a reinforcing fiber, an antioxidant, and an acid scavenger.

9. The lightweight tire support of claim 1, wherein the polyurethane has a tensile modulus that changes by no more than 10 percent over a temperature range of −50° C. and 150° C. based on dynamic mechanical spectroscopy.

10. The lightweight tire support of claim 9, wherein the polyurethane has a tensile modulus that changes by no more than 8 percent over a temperature range of −50° C. and 150° C. based on dynamic mechanical spectroscopy.

11. The light weight tire support of claim 10, wherein said tire support has a change in tensile modulus over a temperature range of −50° C. and 150° C. substantially similar to a rubber tire support's change in tensile modulus over a temperature range of −50° C. and 150° C. based on dynamic mechanical spectroscopy.

12. The lightweight tire support of claim 1, wherein the compound is zinc stearate or a wax.

13. The lightweight tire support of claim 12 wherein the compound is zinc stearate.

14. A method of reaction injection molding a lightweight tire support, the method comprising:
   (a) forming an isocyanate side stream by mixing (i) an isocyanate prepolymer of a first monomeric isocyanate and a first polyol having an equivalent weight of at least about 1250 and (ii) a second monomeric isocyanate;
   (b) injecting the isocyanate-side stream into a processing mold designed to mold a tire support;
   (c) injecting a polyol-side stream into the processing mold, said polyol-side stream comprising a second polyol that has an equivalent weight of at least about 1250 and at least one chain extender; and
   (d) reacting the isocyanate-side stream and the polyol-side stream in the processing mold to form a tire support, wherein the first and second polyols are comprised of a polyether polyol selected from the group consisting of a polypropylene oxide polyol, ethylene oxide capped polyol and mixture thereof.

15. The method of claim 14 wherein the first monomeric isocyanate is the same or different than the second monomeric isocyanate.

16. The method of claim 15 wherein the first monomeric isocyanate is the same as the second monomeric isocyanate.

17. The method of claim 16 wherein the first monomeric isocyanate is selected from the group consisting of 4,4'-diphenylmethanediisocyanate, 2,4'-diphenylmethanediisocyanate, 2,2'-diphenylmethanediisocyanate and mixtures thereof.

18. The method of claim 14 wherein first and second polyols have an equivalent weight of at least about 1500.

19. The method of claim 18 wherein the equivalent weight is at least about 1600.

20. The method of claim 14 wherein the first and second polyols have a molecular weight of about 4500 to about 10,000.

21. The method of claim 14 wherein the first polyol is comprised of a polypropylene oxide polyol and the second polyol is comprised of an ethylene oxide capped polyol.

22. The method of claim 21 wherein the first polyol is the polypropylene oxide polyol and the second polyol is the ethylene oxide capped polyol.

* * * * *